(12) United States Patent
Gounares et al.

(10) Patent No.: US 8,656,134 B2
(45) Date of Patent: Feb. 18, 2014

(54) OPTIMIZED MEMORY CONFIGURATION DEPLOYED ON EXECUTING CODE

(71) Applicant: Concurix Corporation, Kirkland, WA (US)

(72) Inventors: Alexander G. Gounares, Kirkland, WA (US); Ying Li, Bellevue, WA (US); Charles D. Garrett, Woodinville, WA (US); Michael D. Noakes, Burien, WA (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/671,836

(22) Filed: Nov. 8, 2012

(65) Prior Publication Data
US 2013/0074092 A1    Mar. 21, 2013

(51) Int. Cl.
*G06F 12/00*    (2006.01)
*G06F 9/00*    (2006.01)

(52) U.S. Cl.
USPC ............... 711/170; 711/154; 711/E12.005; 717/136

(58) Field of Classification Search
None
See application file for complete search history.

(56) References Cited

U.S. PATENT DOCUMENTS

| | | | |
|---|---|---|---|
| 3,643,227 A | 2/1972 | Smith et al. | |
| 4,631,674 A | 12/1986 | Blandy | |
| 5,506,987 A | 4/1996 | Abramson et al. | |
| 5,875,464 A * | 2/1999 | Kirk | 711/129 |
| 5,900,001 A | 5/1999 | Wolczko et al. | |
| 5,903,900 A | 5/1999 | Knippel et al. | |
| 6,006,235 A | 12/1999 | Macdonald et al. | |
| 6,038,572 A | 3/2000 | Schwartz et al. | |
| 6,047,295 A | 4/2000 | Endicott et al. | |
| 6,098,080 A | 8/2000 | Endicott et al. | |
| 6,104,962 A | 8/2000 | Sastry | |
| 6,128,642 A | 10/2000 | Doraswamy et al. | |
| 6,230,183 B1 | 5/2001 | Yocom et al. | |
| 6,289,360 B1 | 9/2001 | Kolodner et al. | |
| 6,308,319 B1 | 10/2001 | Bush et al. | |
| 6,317,756 B1 | 11/2001 | Kolodner et al. | |
| 6,421,704 B1 | 7/2002 | Waldo et al. | |
| 6,484,188 B1 | 11/2002 | Kwong et al. | |
| 6,490,599 B2 | 12/2002 | Kolodner et al. | |
| 6,490,612 B1 | 12/2002 | Jones et al. | |
| 6,516,461 B1 | 2/2003 | Ichisugi | |

(Continued)

FOREIGN PATENT DOCUMENTS

EP    1912119 A    4/2008

OTHER PUBLICATIONS

International Searching Authority, International Search Report and Written Opinion, Korean Intellectual Property Office, PCT/US2013/041178, Aug. 29, 2013.

(Continued)

*Primary Examiner* — Matthew Bradley
*Assistant Examiner* — Daniel Bernard
(74) *Attorney, Agent, or Firm* — Russell S. Krajec

(57) ABSTRACT

A configurable memory allocation and management system may generate a configuration file with memory settings that may be deployed at runtime. An execution environment may capture a memory allocation boundary, look up the boundary in a configuration file, and apply the settings when the settings are available. When the settings are not available, a default set of settings may be used. The execution environment may deploy the optimized settings without modifying the executing code.

20 Claims, 8 Drawing Sheets

(56) References Cited

U.S. PATENT DOCUMENTS

| | | |
|---|---|---|
| 6,519,615 B1 | 2/2003 | Wollrath et al. |
| 6,542,978 B2 | 4/2003 | Goldstein et al. |
| 6,560,773 B1 | 5/2003 | Alexander, III et al. |
| 6,564,240 B2 | 5/2003 | Waldo et al. |
| 6,658,449 B1 | 12/2003 | Brenner et al. |
| 6,735,769 B1 | 5/2004 | Brenner et al. |
| 6,738,875 B1 | 5/2004 | Wang |
| 6,748,593 B1 | 6/2004 | Brenner et al. |
| 6,760,736 B2 | 7/2004 | Waldo et al. |
| 6,763,520 B1 | 7/2004 | Seeds |
| 6,823,515 B2 | 11/2004 | Livecchi |
| 6,832,370 B1 | 12/2004 | Srinivasan et al. |
| 6,868,488 B2 | 3/2005 | Garthwaite |
| 6,873,952 B1 | 3/2005 | Bailey et al. |
| 6,912,554 B2 | 6/2005 | Yuasa |
| 6,918,111 B1 | 7/2005 | Damron et al. |
| 6,925,644 B2 | 8/2005 | Waldo et al. |
| 6,954,775 B1 | 10/2005 | Shanklin et al. |
| 6,986,140 B2 | 1/2006 | Brenner et al. |
| 6,993,767 B2 | 1/2006 | Brenner et al. |
| 6,999,979 B2 | 2/2006 | Garthwaite |
| 7,003,760 B1 | 2/2006 | Das |
| 7,016,923 B2 | 3/2006 | Garthwaite et al. |
| 7,031,990 B2 | 4/2006 | Garthwaite |
| 7,035,884 B2 | 4/2006 | Garthwaite |
| 7,058,670 B2 | 6/2006 | Garthwaite |
| 7,062,518 B2 | 6/2006 | Garthwaite |
| 7,062,519 B2 | 6/2006 | Garthwaite |
| 7,069,279 B1 | 6/2006 | Rau et al. |
| 7,069,280 B2 | 6/2006 | Garthwaite |
| 7,069,281 B2 | 6/2006 | Garthwaite |
| 7,076,511 B1 | 7/2006 | Lari et al. |
| 7,092,978 B2 | 8/2006 | Garthwaite |
| 7,096,238 B2 | 8/2006 | Garthwaite |
| 7,136,887 B2 | 11/2006 | Garthwaite et al. |
| 7,143,124 B2 | 11/2006 | Garthwaite |
| 7,188,129 B2 | 3/2007 | Garthwaite |
| 7,209,935 B2 | 4/2007 | Garthwaite |
| 7,225,439 B2 | 5/2007 | Garthwaite |
| 7,228,541 B2 | 6/2007 | Gupton et al. |
| 7,251,815 B2 | 7/2007 | Donovan et al. |
| 7,308,466 B2 | 12/2007 | Houldsworth |
| 7,404,182 B1 | 7/2008 | Garthwaite et al. |
| 7,412,580 B1 | 8/2008 | Garthwaite |
| 7,487,237 B2 | 2/2009 | Lloyd et al. |
| 7,558,935 B1 * | 7/2009 | Boucher et al. ............... 711/170 |
| 7,565,386 B2 | 7/2009 | Joisha |
| 7,565,499 B1 | 7/2009 | Garthwaite |
| 7,599,973 B2 | 10/2009 | Detlefs et al. |
| 7,613,753 B2 | 11/2009 | Cornet et al. |
| 7,640,544 B2 | 12/2009 | Flood et al. |
| 7,752,417 B2 | 7/2010 | Manczak et al. |
| 7,797,670 B2 | 9/2010 | Bumgarner et al. |
| 7,865,707 B2 | 1/2011 | Bittlingmayer et al. |
| 7,890,712 B2 | 2/2011 | Bitner et al. |
| 7,984,083 B2 | 7/2011 | Bacon et al. |
| 7,996,446 B2 | 8/2011 | Bacon et al. |
| 8,015,385 B2 * | 9/2011 | Schopp ..................... 711/171 |
| 8,028,277 B2 | 9/2011 | Breitgand et al. |
| 8,055,725 B2 | 11/2011 | Alam et al. |
| 8,108,863 B2 | 1/2012 | Rakvic et al. |
| 8,495,598 B2 | 7/2013 | Gounares et al. |
| 2001/0018701 A1 | 8/2001 | Livecchi |
| 2002/0116485 A1 * | 8/2002 | Black et al. ................... 709/223 |
| 2003/0200356 A1 | 10/2003 | Hue |
| 2003/0212731 A1 | 11/2003 | Brenner et al. |
| 2004/0107329 A1 | 6/2004 | Krejsa |
| 2004/0194104 A1 | 9/2004 | Beresnevichiene et al. |
| 2004/0236922 A1 | 11/2004 | Boucher et al. |
| 2005/0071847 A1 | 3/2005 | Bentley et al. |
| 2005/0144364 A1 | 6/2005 | Tu et al. |
| 2005/0166193 A1 | 7/2005 | Smith et al. |
| 2005/0188164 A1 * | 8/2005 | Ballantyne et al. ........... 711/159 |
| 2005/0210472 A1 | 9/2005 | Accapadi et al. |
| 2005/0235050 A1 | 10/2005 | Baker |
| 2005/0262324 A1 | 11/2005 | Mathiske |
| 2006/0069593 A1 | 3/2006 | Estefania et al. |
| 2006/0112254 A1 * | 5/2006 | Piper et al. .................... 711/171 |
| 2006/0242637 A1 | 10/2006 | Betarbet |
| 2006/0294167 A1 | 12/2006 | Borman et al. |
| 2007/0088716 A1 | 4/2007 | Brumme et al. |
| 2007/0136403 A1 * | 6/2007 | Kasuya ........................ 707/206 |
| 2007/0288911 A1 | 12/2007 | Martin et al. |
| 2008/0005719 A1 | 1/2008 | Morris |
| 2008/0126453 A1 | 5/2008 | Cornet et al. |
| 2008/0139191 A1 | 6/2008 | Melnyk et al. |
| 2008/0155090 A1 | 6/2008 | Ruscin et al. |
| 2008/0271032 A1 | 10/2008 | Twaddle |
| 2008/0282028 A1 | 11/2008 | Balakrishnan et al. |
| 2008/0295113 A1 | 11/2008 | Breitgand et al. |
| 2009/0024679 A1 | 1/2009 | Amundsen et al. |
| 2009/0089552 A1 | 4/2009 | Inchingolo et al. |
| 2009/0106506 A1 | 4/2009 | Skerlj et al. |
| 2009/0150613 A1 | 6/2009 | Wang et al. |
| 2009/0276183 A1 | 11/2009 | Kusner et al. |
| 2010/0018701 A1 | 1/2010 | Peter et al. |
| 2010/0058016 A1 * | 3/2010 | Nikara et al. .................. 711/163 |
| 2010/0153443 A1 | 6/2010 | Gaffga et al. |
| 2010/0211756 A1 | 8/2010 | Kaminski et al. |
| 2010/0235603 A1 * | 9/2010 | Ravindranath et al. ........ 711/170 |
| 2010/0318630 A1 | 12/2010 | Howell et al. |
| 2010/0318637 A1 * | 12/2010 | Ly et al. ........................ 709/221 |
| 2010/0325381 A1 * | 12/2010 | Heim ............................ 711/170 |
| 2010/0333109 A1 | 12/2010 | Milnor |
| 2011/0067030 A1 | 3/2011 | Isard et al. |
| 2011/0087387 A1 | 4/2011 | Safa-Bakhsh et al. |
| 2011/0145609 A1 | 6/2011 | Berard et al. |
| 2011/0283071 A1 | 11/2011 | Yokoya et al. |
| 2012/0047514 A1 | 2/2012 | Seo et al. |
| 2012/0089710 A1 | 4/2012 | Rakowski et al. |
| 2012/0102500 A1 | 4/2012 | Waddington et al. |
| 2012/0204189 A1 | 8/2012 | Eichenberger et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0278585 A1 * | 11/2012 | Gupta et al. ................... 711/170 |
| 2012/0284730 A1 | 11/2012 | Decusatis et al. |
| 2012/0297163 A1 | 11/2012 | Breternitz et al. |
| 2012/0317371 A1 | 12/2012 | Gounares |
| 2012/0317389 A1 | 12/2012 | Gounares |
| 2012/0317421 A1 | 12/2012 | Gounares |
| 2012/0317557 A1 | 12/2012 | Garrett |
| 2012/0317577 A1 | 12/2012 | Garrett |
| 2012/0317587 A1 | 12/2012 | Garrett |
| 2012/0324454 A1 | 12/2012 | Gounares et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0117753 A1 | 5/2013 | Gounares et al. |
| 2013/0117759 A1 | 5/2013 | Gounares et al. |
| 2013/0117766 A1 * | 5/2013 | Bax et al. ...................... 719/323 |
| 2013/0212064 A1 * | 8/2013 | Mahmoud et al. ............ 707/609 |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |

(56) References Cited

U.S. PATENT DOCUMENTS

2013/0232433 A1    9/2013    Krajec et al.
2013/0232452 A1    9/2013    Krajec et al.
2013/0263102 A1*  10/2013    Ergan et al. .................. 717/158

OTHER PUBLICATIONS

Daniel Lenoski, James Laudon, Kourosh Gharachorloo, Wolf-Dietrich Weber, Anoop Gupta, John Hennessy, Mark Horowitz, and Monica S. Lam, The Stanford Dash Multiprocessor, Mar. 1992, IEEE.

International Search Authority, International Search Report and Written Opinion, Korean Intellectual Property Office, PCT/US2013/037523, Jul. 31, 2013.

International Search Authority, International Search Report and Written Opinion, Korea Intellectual Property Office, PCT/US2013/041009, Aug. 19, 2013.

International Search Authority, International Search Report and Written Opinion, Korean Intellectual Property Office, PCT/US2013/041184, Sep. 27, 2013.

International Search Authority, International Search Report and Written Opinion, Korean Intellectual Property Office, PCT/US2012/066098, Mar. 12, 2013.

International Search Authority, International Search Report and Written Opinion, Korean Intellectual Property Office, PCT/US2012/045964, Jan. 24, 2013.

International Search Authority, International Search Report and Written Opinion, Korean Intellectual Property Office, PCT/US2013/041165, Jul. 1, 2013.

International Search Authority, International Search Report and Written Opinion, Korean Intellectual Property Office, PCT/US2012/066076, Feb. 22, 2013.

International Search Authority, International Search Report and Written Opinion, Korean Intellectual Property Office, PCT/US2012/063040, May 15, 2013.

International Search Authority, International Search Report and Written Opinion, Korean Intellectual Property Office, PCT/US2012/043811, Jan. 29, 2013.

International Search Authority, International Search Report and Written Opinion, Korean Intellectual Property Office, PCT/US2012/056701, Feb. 27, 2013.

International Search Authority, International Search Report and Written Opinion, Korean Intellectual Property Office, PCT/US2012/056704, Feb. 5, 2013.

International Search Authority, International Search Report and Written Opinion, Korean Intellectual Property Office, PCT/US2012/041036, Jan. 25, 2013.

Kistler, Thomas, "Continuous Program Optimization", PhD Dissertation, University of California, Irvine, 1999.

Kistler, Thomas, "Continuous Program Optimization: A Case Study", ACM Transactions on Programming Languages and Systems, vol. 25, No. 4, Jul. 2003, pp. 500-548.

Tong Li, Dan Baumberger, David A. Koufaty, and Scott Hahn, Efficient Operating System Scheduling for Performance-Asymmetric Multi-Core Architectures, Copyright 2007, ACM.

Yang Wang, Paul Lu, Using Dataflow Information to Improve Inter-Workflow Instance Concurrency, 2005, IEEE.

* cited by examiner

OPTIMIZED MEMORY CONFIGURATION DEPLOYED ON EXECUTING CODE

BACKGROUND

Computer execution systems allocate memory to various processes when the processes are launched. As a process executes, additional memory may be allocated to the process or unused memory may be deallocated and used by other processes.

Some execution systems may have garbage collection systems and other memory management functions that may attempt to efficiently use the memory in the system.

In many execution systems, memory allocation and management may be designed for a general purpose application. Such systems may have a single allocation scheme, for example, that may be applied to all executable code.

SUMMARY

A configurable memory allocation and management system may generate a configuration file with memory settings that may be deployed at runtime. An execution environment may capture a memory allocation boundary, look up the boundary in a configuration file, and apply the settings when the settings are available. When the settings are not available, a default set of settings may be used. The execution environment may deploy the optimized settings without modifying the executing code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
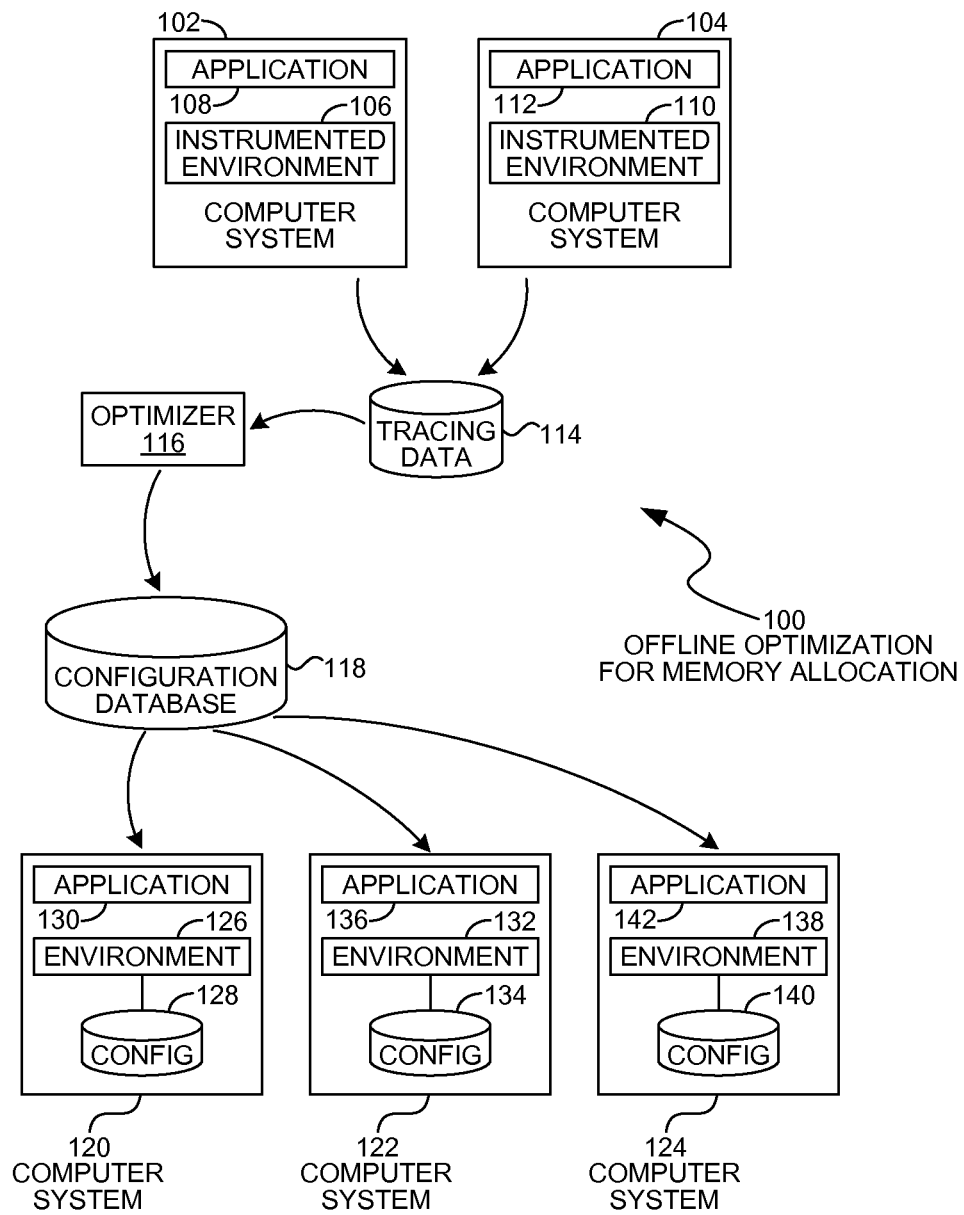
FIG. 1 is a diagram illustration of an embodiment showing a system with offline optimization for memory allocation and management.

A software execution system may use a configuration file to define various memory allocation and garbage collection parameters. The system may be able to apply different memory allocation and management parameters to individual applications, processes, and functions, which may be known as managed entities. Each managed entity may have an entry in the configuration file, and when the entity performs a memory allocation operation, the configuration file may be queried to determine or derive the corresponding parameters.

The system may use offline analysis to generate the configuration file, then distribute the configuration file to multiple devices that execute a particular application or set of applications. Operational data may be collected from instrumented versions of an execution system and transmitted to a remote optimization system. The remote optimization system may generate the configuration file and distribute the configuration file to devices that may execute the application with a non-instrumented version of the execution system. In some cases, the configuration file may be used with a lightly instrumented execution system or one in which the instrumentation may be minimized.

The remote optimizer may determine an optimized set of memory configuration parameters by analyzing data gathered from many instrumented systems. In some cases, the remote optimizer may analyze data from differently configured computer systems, such as systems with different hardware, different operating systems, different configurations of operating systems, different additional applications, and other differences.

The remote optimizer may identify certain states in which a set of configuration parameters may be valid. The state definition may include static state information, such as hardware and software configuration, as well as dynamic state information, such as the amount of available memory and the state of other applications running on the system. The combination of static and dynamic state information may be included in a configuration file to identify the appropriate state for specific settings.

Throughout this specification and claims, the term "configuration file" is used to denote a database that may be consumed by an execution environment. In some cases, the "configuration file" may be an actual file managed within an operating system's file system, but in other cases, the "configuration file" may be represented as some other form of database that may be consumed by the execution environment. The term "configuration file" is used as convenient description for the purposed of this specification and claims, but is not meant to be limiting.

In many embodiments, data may be collected when the target executable code is run to determine dynamic and operational monitored parameters. Monitored parameters collected from the target code may not include any personally identifiable information or other proprietary information without specific permission of the user. In many cases, many optimized configurations may be generated without knowledge of the workload handled by the executable code.

In the case where the monitoring occurs in an execution environment such as an operating system or virtual machine, the monitoring may collect operating system and virtual machine performance data without examining the application or other workload being executed. In the case where the monitoring occurs within an application, the monitoring may collect operational and performance data without collecting details about the input or output of the application.

In the case when data may be collected without an agreement to provide optimization, the collected data may be anonymized, summarized, or otherwise have various identifiable information removed from the data.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with remote analysis and optimization for memory allocation. Embodiment 100 illustrates a generic workflow where instrumented systems may collect tracing data that is analyzed by an optimizer to create a configuration database. The configuration database, sometimes referred to as a configuration file, may be consumed by other devices.

The system may collect data from many different devices that execute an application or other workload under many different circumstances. These devices 102 and 104 may each have an instrumented environment which executes an application. In the example of embodiment 100, device 102 is illustrated as having an instrumented environment 106 and running application 108 and device 104 is illustrated as having an instrumented environment 110 running application 112. In both cases, the application 108 and 112 may be the same application.

The instrumented environments 106 and 110 may collect and transmit tracing data 114. The tracing data 114 may include static and dynamic data regarding the execution of an application. The static data may include various environmental descriptors that may describe the hardware and software comprising the devices, while the dynamic data may relate to the execution of the application.

The static data may include environmental descriptors such as the operating system, user, location, as well as other applications, services, and software either running or available on the device. Such data may be considered 'static' in the sense that the data may not change during the execution of a target application.

The dynamic data may include any value that may change during execution. For example, dynamic data may include tracing information that may track the operations of each function, process, thread, or other executable element. The tracing data may include information regarding each memory allocation event or boundary, such as how much memory is available, how much memory is allocated as a result of the event, and other information. The tracing data may also include the function, process, thread, or other component that caused the memory allocation boundary, as well as any values, variables, or other information available, such as values passed to the component or information in a call stack, for example.

In many cases, a snapshot of certain variables may be made at regular intervals or when specific events occur. The snapshots may include information about the state of executing software, such as the number and identify of functions, processes, threads, or other components currently in execution, as well as any components that may be awaiting execution.

In embodiments where data being processed by an application may be collected, the data may be anonymized, scrubbed, or otherwise processed to remove personally identifiable or other sensitive information. Such data may be collected when a user has expressly granted permission for collection.

The tracing data 114 may be collected from many different devices that execute the same application in different conditions. In some cases, the diversity of data sources may lead to a more reliable optimization.

The output of the optimizer 116 may be a configuration database 118 that may be consumed by the computer systems 120, 122, and 124. The computer system 120 is shown with an execution environment 126 and configuration file 128 and application 130. Computer system 122 is shown with an execution environment 132 and configuration file 134 and application 136. Similarly, computer system 124 is shown with an execution environment 138, a configuration file 140, and an application 142.

The configuration database 118 may be distributed to various client computers 120, 122, and 124 that may or may not have contributed data to the tracing data 114. In some cases, a small sample of instrumented computer systems 102 and 104 may create the tracing data 114 from which the configuration database 118 is generated. The configuration database 118 may then be used by a different set of computers 120, 122, and 124.

In one use scenario, a set of instrumented systems may execute an application under a wide variety of conditions to generate tracing data 114. The conditions may be test conditions or other conditions so that an application may be extensively exercised. The resulting configuration database 118 may then be used by multiple client computer systems 120, 122, and 124 to execute a production version of the application in an optimized manner.

For example, the target application may be an application that may receive API calls and return a value. The application may be run under test conditions to exercise all possible inputs or requests. During such testing, tracing data may be collected and optimized to generate a configuration database.

The optimized configuration in the configuration database 118 may be any representation of an optimized configuration. In some cases, an optimized configuration may be a constant value or set of constant values that may be applied at a memory allocation boundary. In other cases, the optimized configuration may be a function or expression, which may be expressed in executable code or other expression.

Figure 2:
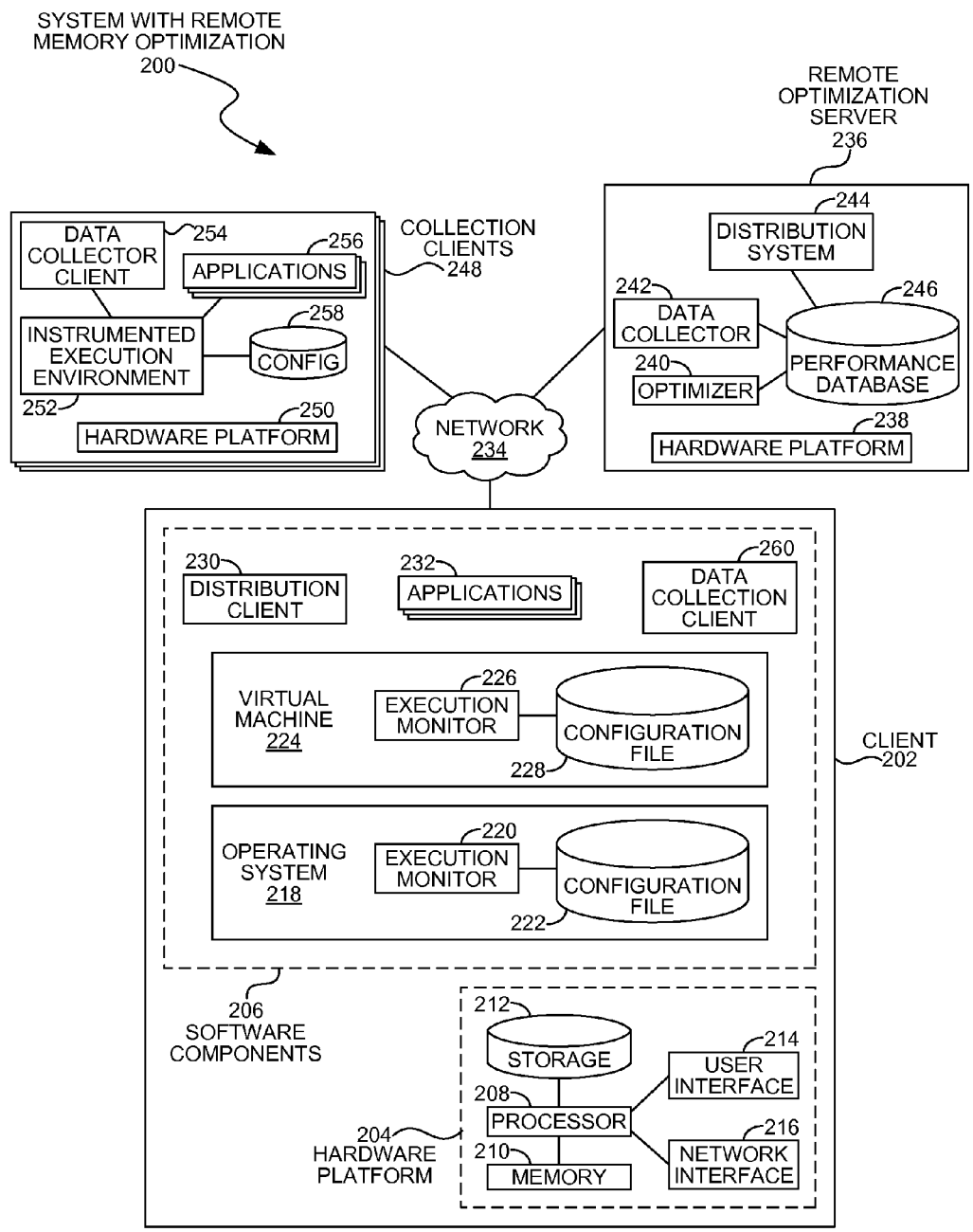
FIG. 2 is a diagram illustration of an embodiment showing a device with an execution environment that may use a configuration file for memory allocation and management.

FIG. 2 is a diagram of an embodiment 200 showing a client computer system with a system with a configuration file. Embodiment 200 illustrates hardware components that may create, deliver, and consume optimized configuration information.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the optimization server 202 may be a server computer. In some embodiments, the optimization server 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The client 202 may have an operating system 218 that may execute various applications 232 and function as an execution environment. As an execution environment, the operating system 218 may have an execution monitor 220 which may detect when memory allocation boundaries occur, consult a configuration file 222, and allocate and manage memory in a different manner when an entry exists in the configuration file 222.

In some embodiments, a virtual machine 224 may operate as an execution environment. As such, the virtual machine 224 may contain an execution monitor 226 which may detect a memory allocation boundary, consult a configuration file 228, and allocate and manager memory in a different manner when an entry exists in the configuration file 228.

The virtual machine 224 may be a process virtual machine or other environment that manages execution of applications 232. Such environments may allocate memory, perform garbage collection, as well as other memory management tasks.

An execution environment, whether it is a virtual machine 224 or operating system 218, may capture memory allocation events or boundaries, then apply special handling to the memory when the event may be found in a configuration file. In many cases, the configuration file may include parameters, descriptors, or other information that may be used by the execution environment to allocate and manage memory.

Capturing memory allocation events may be done in a passive manner by monitoring the execution of an application and detecting that a memory allocation boundary has been breached. Once detected, a lookup may be performed against a configuration file, and the configuration file may include parameters, indicators, or other information that may be consumed by the execution environment.

In some embodiments, the memory allocation events may be identified by decorations added to the application. For example, those memory allocation events for which an entry exists in a configuration file may have code or other decorations added to the application at each memory allocation event. The decorations may be identified by an execution monitor and the lookup performed against the configuration file. In some cases, the decorations may be executable code or merely flags or other annotations that may be processed by an execution monitor.

A distribution client 230 may receive configuration files 222 and 228 from a remote optimization server 236. The distribution client 230 may be an application that may interact with the remote optimization server 236 in different manners depending on the embodiment. Some embodiments may subscribe to a feed provided by the remote optimization server 236, while other embodiments may poll the remote optimization server 236 and periodically request updates to a configuration file. Other embodiments may push changes from the remote optimization server 236 to the distribution client 230.

A network 234 may connect the client 202 to the remote optimization server 236, which may be connected to various collection clients 248. The remote optimization server 236 may collect tracing and performance data from the collection clients 248 and determine an optimized configuration file for specific applications.

The remote optimization server 236 may have a hardware platform 238 on which an optimizer 240 may execute. The optimizer 240 may create configuration files from a performance database 246 that contains trace data and other information collected from the various collection clients 248. A data collector 242 may interact with the collection clients 248 to gather the performance data.

A distribution system 244 may manage the configuration files and transmit the configuration files to client devices, such as the client 202.

The collection clients 248 may contain a hardware platform 250 on which an instrumented execution environment 252 may execute applications 256. During the execution, the instrumented execution environment 252 may collect tracing data, state data, and other information that may be transmitted to the remote optimization server 236 by a data collector client 254.

In some embodiments, the collection clients 248 may have a configuration file 258. The configuration file 258 may be used in two scenarios.

In a first scenario, the configuration file 258 may be an optimized configuration that may be generated by the remote optimization server 236. In such a scenario, the collection clients 248 may continue to collect performance data after the optimized configuration file has been generated. Such an operation may collect information that may verify or further tune the configuration file in an iterative process.

In a second scenario, the configuration file 258 may be populated at least in part by the instrumented execution environment 252. In one version of such a scenario, the instrumented execution environment 252 may identify memory allocation boundaries and create records for the boundaries in the configuration file 258. The configuration file 258 may be transmitted to the remote optimization server 236 and the remote optimization server 236 may populate the configuration file with a set of optimized values for each memory allocation boundary.

In another version of such a scenario, the instrumented execution environment 252 may perform some or all of the optimizations. For example, the instrumented execution environment 252 may identify a memory allocation boundary, determine an optimized setting, and store the optimized setting in the configuration file 258.

Figure 3:
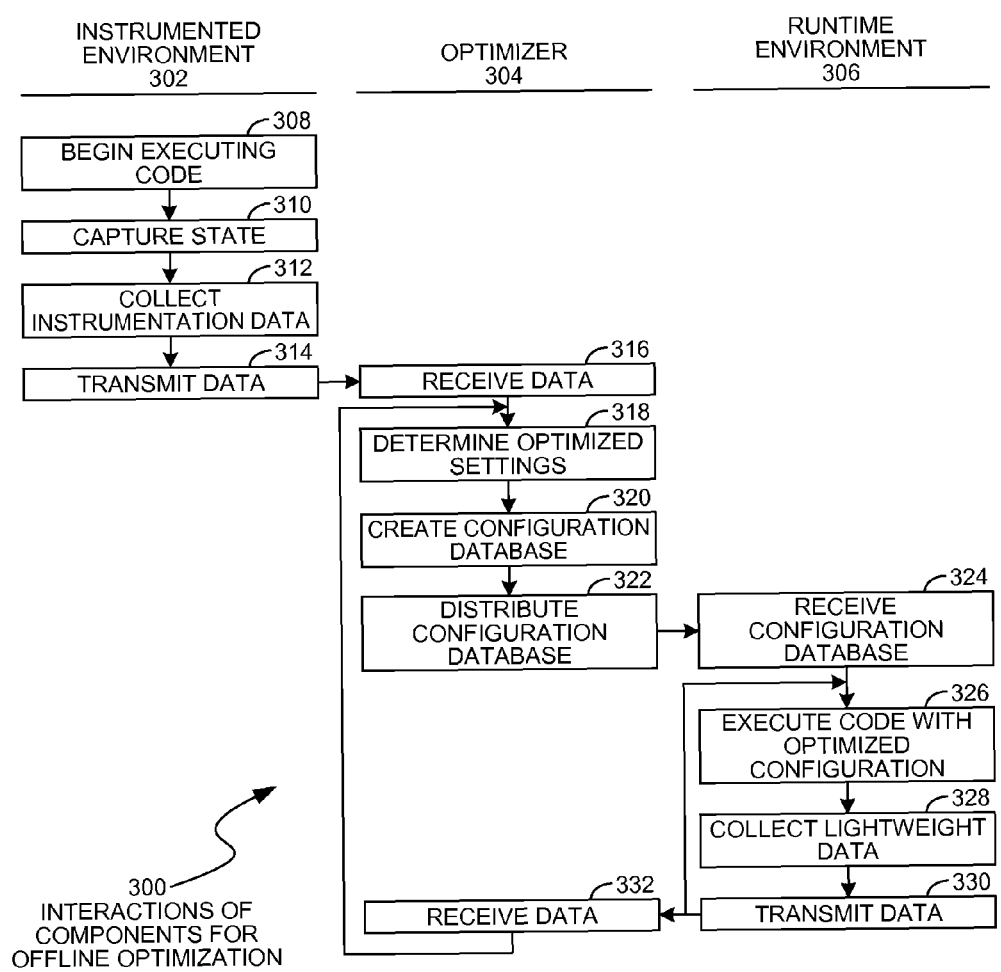
FIG. 3 is a flowchart illustration of an embodiment showing interactions of components for offline optimization.

FIG. 3 is a flowchart illustration of an embodiment 300 showing interactions between an instrumented environment 302, an optimizer 304, and a runtime environment 306. The operations of the instrumented environment 302 are shown in the left hand column, while the operations of the optimizer 304 are shown in the center column and the operations of the runtime environment 306 are shown in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a system where data may be collected from a set of heavily instrumented systems, and optimized to create a configuration file that may be consumed by a runtime system. The runtime system may perform a lightweight data collection which may be fed back to the optimizer.

The instrumented environment 302 may begin executing target code in block 308. The state of the system may be collected in block 310, and instrumentation data may be collected in block 312. The data may be transmitted to the optimizer 304 in block 314.

In many embodiments, multiple instrumented environments may collect data. Each system that collects data may provide state data for that system. The state data may define various static and dynamic characteristics of the hardware, software, and target application.

The optimizer 304 may receive data in block 316 and determine optimized settings in block 318. The optimized settings in block 318 may define various characteristics about memory handling, including memory allocation settings for initial and subsequent allocation events, garbage collection settings and options, and other parameters.

A configuration database may be defined in block 320. The configuration database, sometimes referred to as a configuration file, may contain identifiers for memory allocation boundaries for which optimized memory handling may be defined.

The configuration database may be distributed in block 322 by the optimizer 304 and received by the runtime environment 306 in block 324.

The runtime environment 306 may execute the target application with the optimized configuration in block 326. While the code is executing in the optimized mode, lightweight data collection may be performed in block 328. The collected data may be transmitted in block 330 to the optimizer 304, which may collect the data in block 332 and iterate on the newly received data. Meanwhile, the runtime environment 306 may continue executing the target application in block 326.

FIG. 3 is a flowchart illustration of an embodiment 300 showing interactions between an instrumented environment 302, an optimizer 304, and a runtime environment 306. The operations of the instrumented environment 302 are shown in the left hand column, while the operations of the optimizer 304 are shown in the center column and the operations of the runtime environment 306 are shown in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Figure 4:
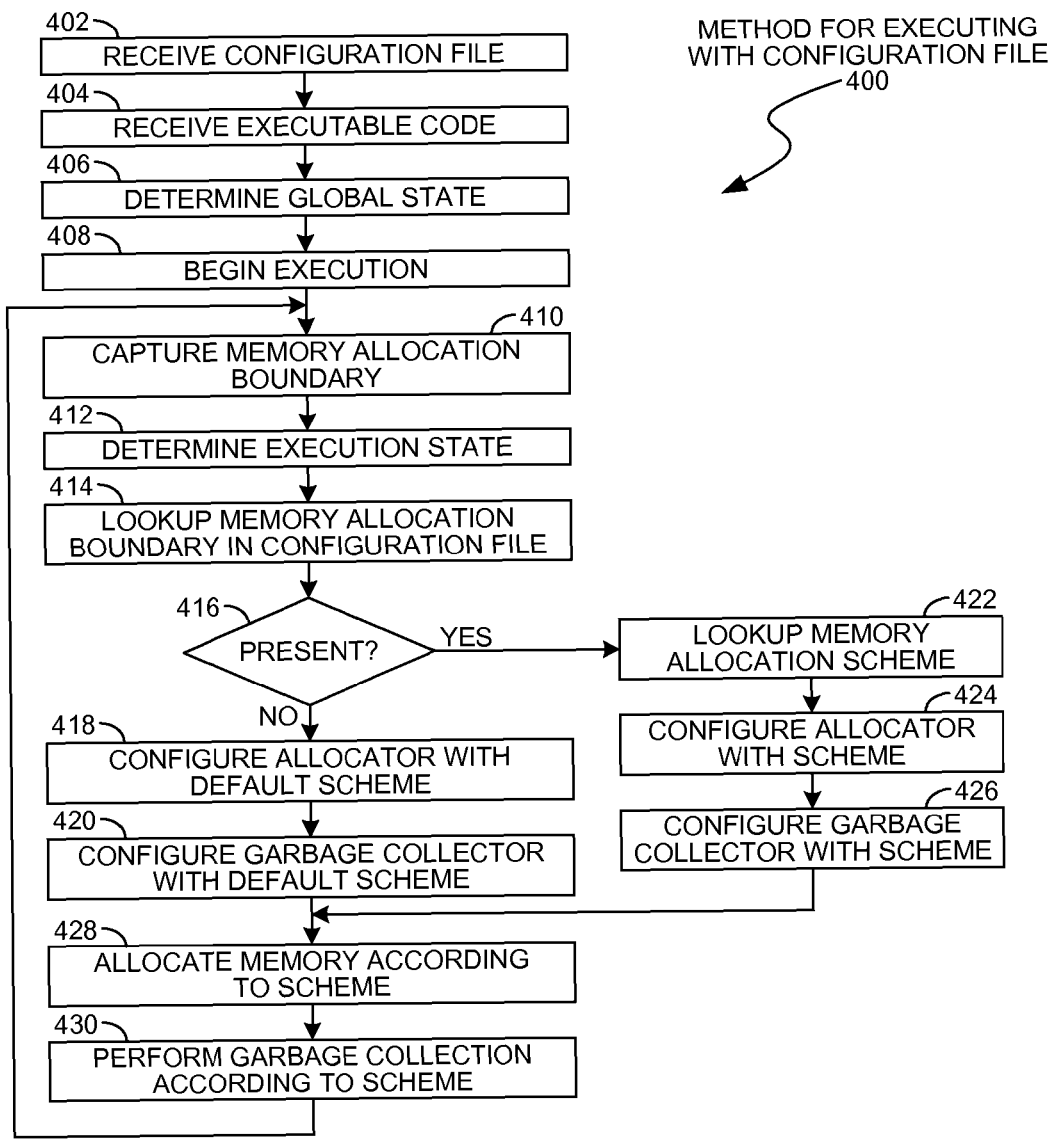
FIG. 4 is a flowchart illustration of an embodiment showing a method for executing a target application with a configuration file.

FIG. 4 is a flowchart illustration of an embodiment 400 showing a method for executing with a configuration file. Embodiment 400 may represent a method performed by an execution environment which may execute with a configuration file and modify memory allocation and management settings when a memory allocation boundary is defined in a configuration file.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may represent an embodiment where memory allocation boundaries may be captured and acted upon when the boundary may be found in a configuration file. The operations of embodiment 400 may be performed with interpreted or compiled code. In some embodiments, the code may be decorated prior to execution to aid in identifying memory allocation boundaries for which customized treatment may be implemented. In such embodiments, the identification of memory allocation boundaries may be performed at compile time and acted upon during execution.

A configuration file may be received in block 402, and target executable code may be received in block 404.

A global state for the system may be determined in block 406. The global state may be any parameter or other information that may define the state of hardware, software, or other components that may affect how the target code may execute. In some embodiments, a configuration file may indicate for which states certain values may be applicable.

Execution of the target code may begin in block 408.

During execution, a memory allocation boundary may be captured or identified in block 410. The execution state may be captured in block 412. Using the execution state and the memory allocation boundary, a lookup may be performed in the configuration file in block 414.

When the memory allocation boundary is not found in the configuration file in block 416, a memory allocation may be configured with a set of default settings in block 418. A garbage collector may also be configured in block 420 with a default garbage collector scheme.

When the memory allocation boundary is found in the configuration file in block 416, the memory allocation scheme may be looked up in block 422. The memory allocation scheme may be defined in the configuration file or other location. Using the defined scheme, the memory allocation may be configured in block 424 and the garbage collection may be similarly configured in block 426.

Memory may be allocated in block 428 according to the defined scheme and garbage collection may be launched in block 430 according to the defined scheme.

The process may return to block 410 to continue execution.

Figure 5:
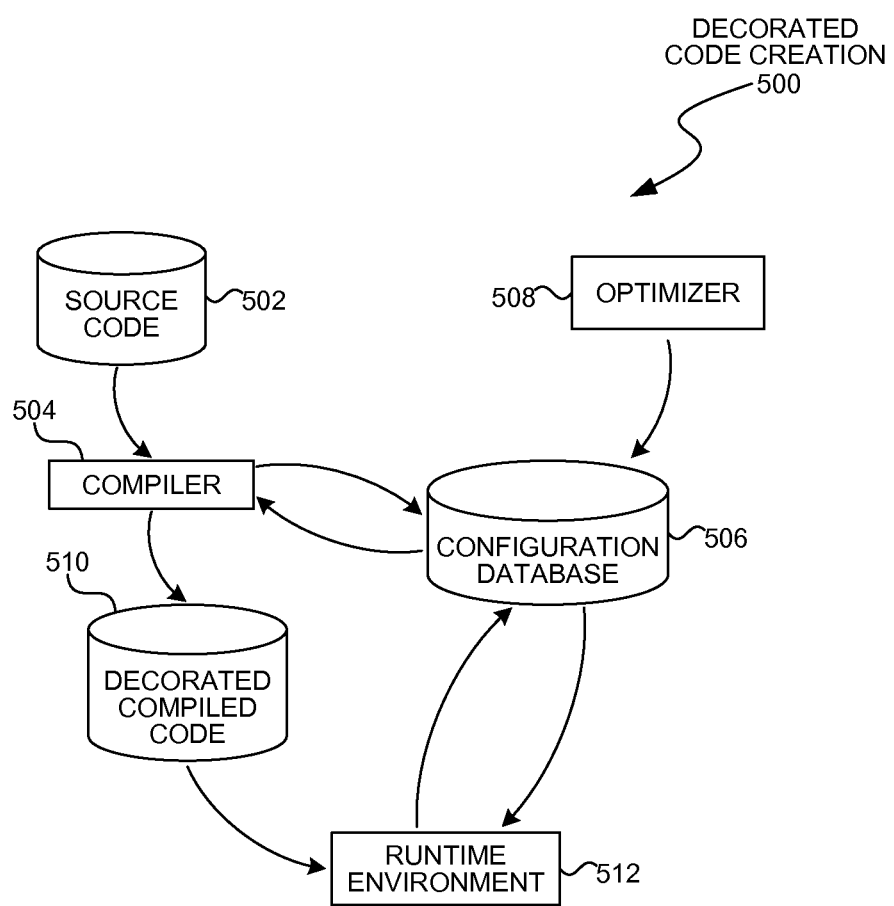
FIG. 5 is a diagram illustration of an embodiment showing a mechanism for decorating compiled code.

FIG. 5 is a diagram illustration of an embodiment 500 showing the creation of decorated code. Embodiment 500 illustrates how a configuration database may be used during compilation to annotate, decorate, or otherwise modify source code prior to execution.

Source code 502 may be compiled by a compiler 504. During compilation, an examination of each memory allocation boundary may be performed. When a memory allocation boundary may be found in a configuration database 506, the code may be decorated to produce decorated compiled code 510.

The decorated compiled code 510 may be consumed by the runtime environment 512.

An optimizer 508 may produce the configuration database 506. In some cases, the optimizer 508 may consume tracing code that may be generated by interpreted or compiled code, but the configuration database 506 may be consumed by compiled code.

The decorations performed during compiling may be merely flagging a memory allocation boundary that a record may exist. In such an embodiment, the runtime environment 512 may attempt to look up the memory allocation boundary in the configuration database 506.

In other embodiments, the decorations may include adding instructions to the decorated compiled code 510 that perform a lookup against the configuration database 506.

In still other embodiments, the decorations may include information from the configuration database 506 that may be used by the runtime environment 512. In such embodiments, the runtime environment 512 may not query the configuration database 506.

The source code 502 may be human readable source code which may produce intermediate code or machine executable code. In some cases, the source code 502 may be intermediate code that may be compiled to machine executable code.

The compiler 504 may be a just-in-time compiler that may perform compilation at runtime in some embodiments.

Figure 6:
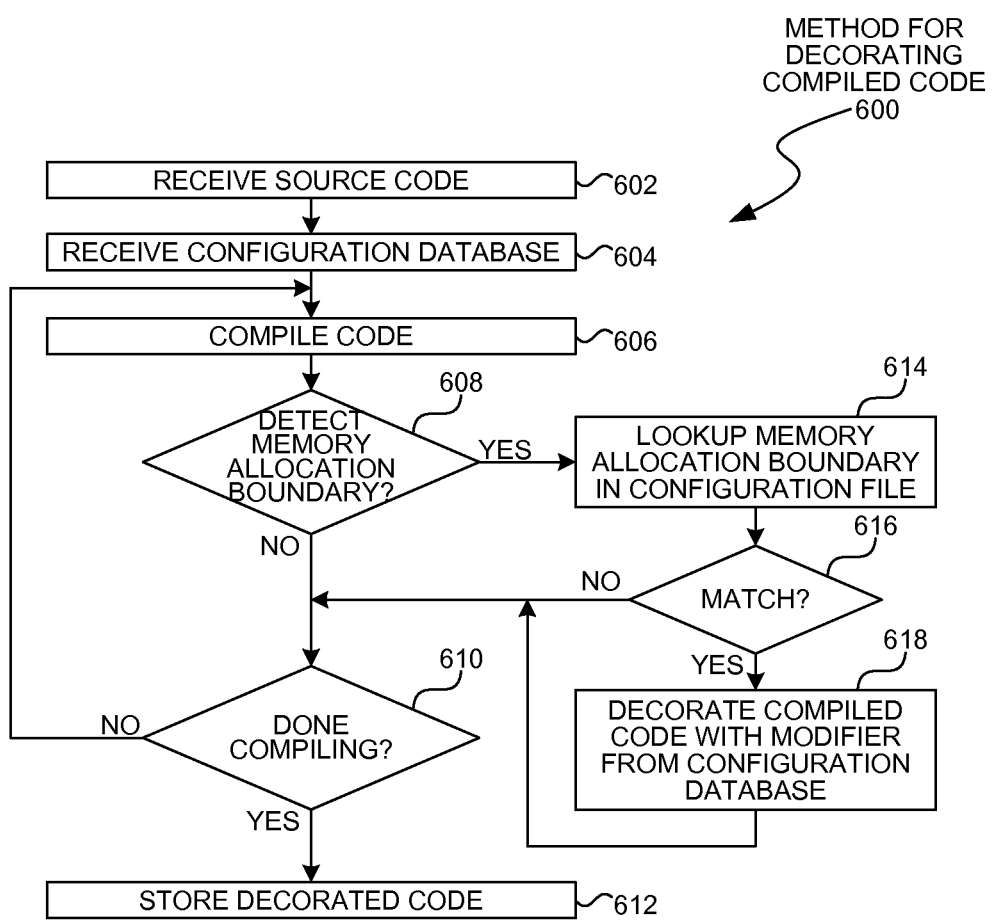
FIG. 6 is a flowchart illustration of an embodiment showing a method for decorating compiled code.

FIG. 6 is a flowchart illustration of an embodiment 600 showing a method for decorating compiled code. Embodiment 600 may represent the operations of a compiler, such as compiler 504 in embodiment 500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may process source code during compilation to identify memory access boundaries and decorate the compiled code with annotations regarding how memory may be handled. The decorations may be hooks or identifiers that may be processed by a runtime environment. In some cases, the decorations may be executable code or parameters that may cause memory management to occur according to a configuration database.

Source code may be received in block 602. The source code may be human readable source code, intermediate code, or other code that may be compiled.

The configuration database may be received in block 604.

Compilation may be performed in block 606.

If a memory allocation boundary is not detected in block 608 and the compiling has not completed, the process loops back to block 606. When the compiling has completed in block 610, the compiled code may be stored in block 612.

When a memory allocation boundary is detected in block 608, the memory allocation boundary may be looked up in the configuration file in block 614. When there is no match in block 616, the process may return to block 610. When there is a match, the compiled code may be decorated in block 618.

In some embodiments, the decorations may be executable commands, sequences, or other code that cause the memory allocation boundary to be handled according to the configuration database. Such embodiments may not perform a look up to the configuration database at runtime. In other embodiments, the decorations may include executable code that performs a look up a configuration database. In still other embodiments, the decorations may be identifiers that may assist a runtime environment in identifying a memory allocation boundary that may have an entry in the configuration database.

Figure 7:
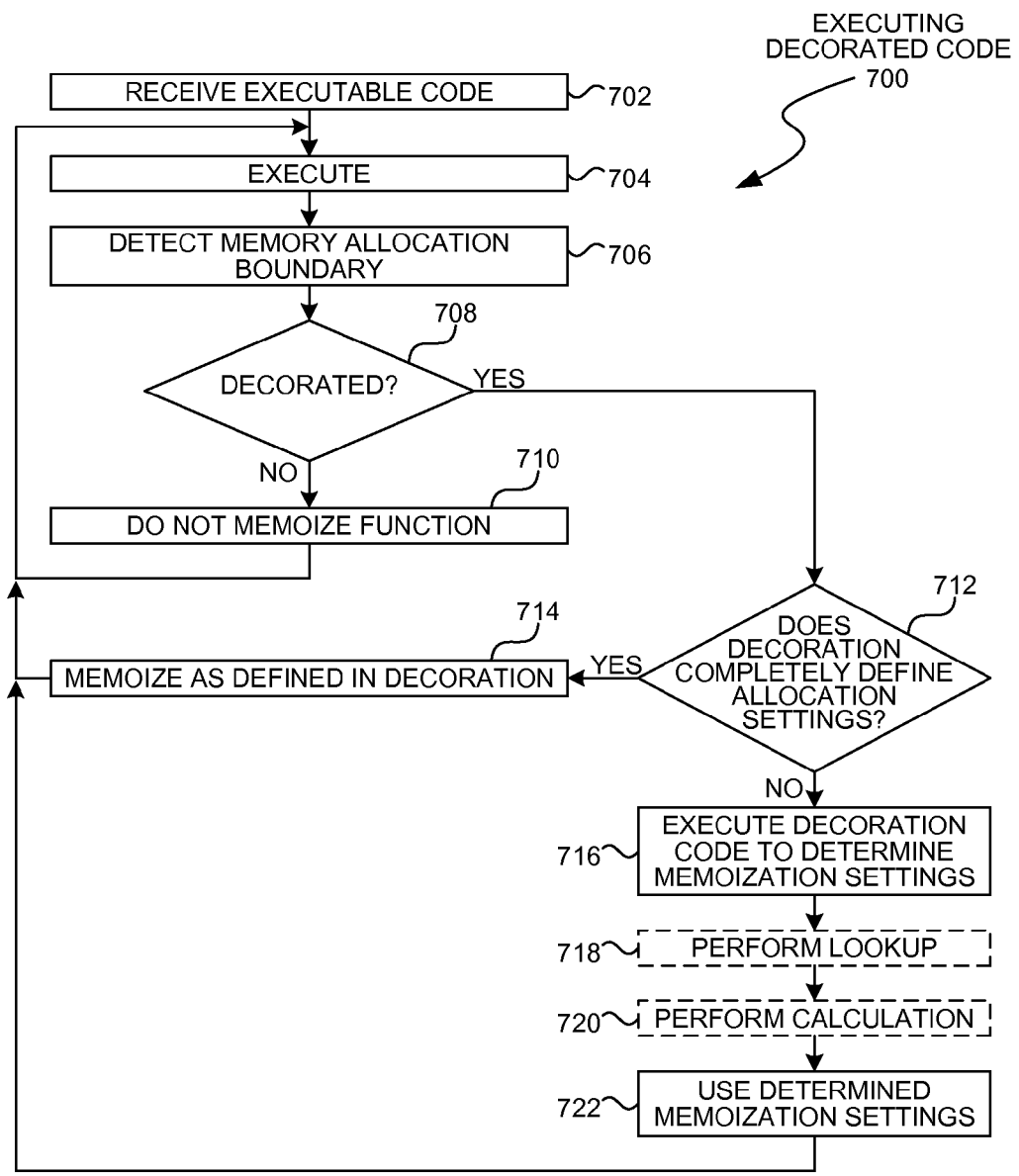
FIG. 7 is a flowchart illustration of an embodiment showing a method for executing decorated code.

FIG. 7 is a flowchart illustration of an embodiment 700 showing a method for executing decorated code. Embodiment 700 may illustrate the operations of a client device that executes code that may have been created by the process of embodiment 600.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates a method by which decorated code may be executed. In some cases, the decorated code may be compiled code that may contain decorations or additions to the code at places where memory allocation may occur. In other cases, the decorated code may be interpreted code to which decorations may have been added.

The executable code may be received in block 702 and may begin executing in block 704.

During execution, a memory allocation boundary may be detected in block 706. If the memory allocation boundary is not decorated in block 710, a default set of memory allocation settings may be used in block 710 and the process may return to block 704.

If the memory allocation boundary is decorated in block 710, the decoration may be evaluated to determine how to allocate memory. In some cases, the decoration may fully define how the memory allocation may proceed. When the decoration completely defines allocation settings in block 712, those allocation settings may be used in block 714.

In other cases, the decoration code may be executed in block 716 to determine the allocation settings. In some cases, a lookup may be performed in block 718. In some cases, the decoration code may define a calculation that may be performed in block 720. The newly determined allocation settings may be used in block 722 to perform the allocation operation.

Figure 8:
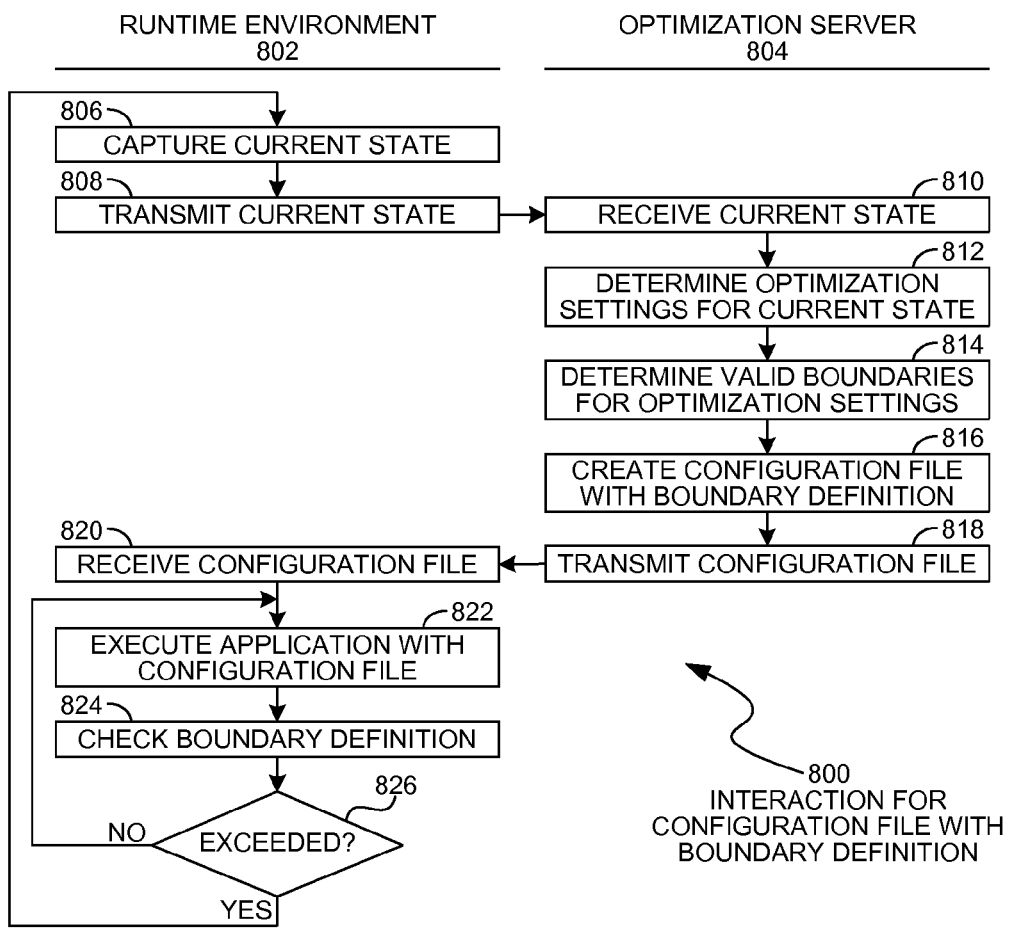
FIG. 8 is a flowchart illustration of an embodiment showing a method for interacting with a configuration file with a boundary definition.

FIG. 8 is a flowchart illustration of an embodiment 800 showing a method for interacting with a configuration file with a boundary definition. The method of embodiment 800 may illustrate a configuration file that includes boundaries. The operations of a client device with a runtime environment 802 are illustrated on the left hand column, and the operations of an optimization server 804 may be shown in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 may illustrate the interaction of a client system and an optimization server. The configuration file consumed by the runtime environment 802 may include boundaries or limits that the client system may monitor. When those boundaries are exceeded, the client system may requests an updated configuration file.

The boundaries in the configuration file may define any limit or boundary for the configuration file. In some cases, the boundaries may include parameters associated with the application. Such boundaries may include parameter values for which a given optimization may be valid, ranges for internal memory objects, or other limits. Such limits may define the range of values from which optimization parameters have been derived or tested. In many cases, parameters outside of the boundaries may cause the client system to operate in a non-optimal manner.

The boundaries may define external inputs to the application, which may include the state of the system on which the application executes. The state may include hardware and software configuration, geographic limitations, or other items.

The hardware configuration may include processor configuration, memory configuration, presence or absence of various peripheral devices. The software configuration may include operating system version and configuration, presence or absence of other applications, services, databases, or other components.

The boundaries may include time limitations or other limitations on execution. For example, a boundary may define a time period for which the configuration file may be valid. In one example, the time period may indicate an expiration date after which the configuration file may not be used. Such an indicator may be part of a business model in which a customer pay purchase optimization services on a subscription basis.

The boundaries may include geographic boundaries, such as jurisdictional boundaries, for which the configuration file may be valid. The geographic boundaries may be contractual limitations for which an optimization service may be purchased.

A time period may reflect a recurring or periodic nature of an optimization. For example, a configuration file may be valid during a period of high use, which may be during regular business hours, but a different configuration file may be used in the evenings or overnight during backup and administrative activities. In another example, a configuration file for an application in a retail consumer business may be valid during a holiday season but not valid afterwards.

The boundaries may define application inputs for which a configuration file may be valid. The boundaries may define ranges of valid input parameters or other input definition. In some cases, the ranges may reflect data for which optimizations have been calibrated or tested, and the ranges may reflect values for which the optimizations may be known to be invalid or harmful.

In block 806, a runtime environment 802 may capture a current state and may transmit the state in block 808 to the optimization server 804, which may receive the state in block 810.

The optimization sever 804 may determine optimization settings for the current state in block 812, determine boundaries for the optimization settings in block 814, and create a configuration file with the boundary definition in block 816.

The configuration file may be transmitted in block 818 from the optimization server 804 and received in block 820 by the runtime environment 802.

The runtime environment 802 may execute the corresponding application with the configuration file in block 822. During execution, the boundaries may be checked in block 824. Provided that the boundaries are met in block 826, the process may loop back to block 822.

When the boundary may be exceeded in block 826, the process may loop back to block 806, where the runtime environment 802 may capture a new state and request a new configuration file from the optimization server 804.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
   receiving executable code;
   executing said executable code;
   during said executing, identifying a memory allocation boundary;
   looking up said memory allocation boundary in a configuration database;
   when said memory allocation boundary is present in said configuration database, determining a memory allocation scheme for said memory allocation boundary and applying said memory allocation scheme to said memory allocation boundary; and when said memory allocation boundary is not present in said configuration database, applying a default memory allocation scheme to said memory allocation boundary.

2. The method of claim 1, said executable code being interpreted code.

3. The method of claim 1, said executable code being precompiled code.

4. The method of claim 1 further comprising:
receiving said configuration database from a remote device.

5. The method of claim 4, said configuration database being a configuration file.

6. The method of claim 1, said memory allocation boundary being a heap allocation event.

7. The method of claim 6, said heap allocation event being an initial heap allocation event.

8. The method of claim 6, said heap allocation event being a subsequent heap allocation event.

9. The method of claim 1, said memory allocation boundary being a process spawn event.

10. The method of claim 9, said configuration database being a hash table.

11. The method of claim 9, said process spawn event being one of a group composed of:
a function call;
an application launch;
a thread launch; and
a process launch.

12. The method of claim 9, said configuration database comprising process identifiers.

13. The method of claim 12, said process identifiers comprising a first process identifier comprising a first variable descriptor.

14. The method of claim 13, said first variable descriptor comprising a variable type descriptor.

15. The method of claim 13, said process identifiers comprising a calling process identifier.

16. A system comprising:
a processor;
an execution environment executing on said processor, said execution environment that:
receives executable code;
executes said executable code;
during said executing, identifies a memory allocation boundary;
looks up said memory allocation boundary in a configuration database;
when said memory allocation boundary is present in said configuration database, determines a memory allocation scheme for said memory allocation boundary and applies said memory allocation scheme to said memory allocation boundary; and
when said memory allocation boundary is not present in said configuration database, applies a default memory allocation scheme to said memory allocation boundary.

17. The system of claim 16, said execution environment comprising:
instrumentation to collect memory usage data while said executable code is executing, said memory usage data being used to generate said configuration database.

18. The system of claim 16 further comprising:
a configuration database manager that:
receives said configuration database.

19. The system of claim 18, said configuration database manager that further:
receives an update to said configuration database; and
updates said configuration database.

20. The system of claim 19, said configuration manager that further:
communicates with a remote server; and
receives said update from said remote server.

* * * * *